United States Patent

[11] 3,602,199

| [72] | Inventor | Richard E. Diggs<br>210 N. River St., P.O. Box 588, Carthage, Mo. 64836 |
|---|---|---|
| [21] | Appl. No. | 869,175 |
| [22] | Filed | Oct. 24, 1969 |
| [45] | Patented | Aug. 31, 1971 |

[54] AUTOMATIC LIVESTOCK SPRAYER
13 Claims, 3 Drawing Figs.

| [52] | U.S. Cl. | 119/159 |
|---|---|---|
| [51] | Int. Cl. | A01k 29/00 |
| [50] | Field of Search | 119/159, 157; 417/469 |

[56] References Cited
UNITED STATES PATENTS

| 3,173,402 | 3/1965 | Cassel | 119/157 |
|---|---|---|---|
| 3,496,914 | 2/1970 | Cowan | 119/157 |

*Primary Examiner*—Hugh R. Chamblee
*Attorney*—Shoemaker & Mattare

ABSTRACT: An automatic livestock sprayer including frame means having means for confining the path of livestock traveling therethrough, the frame means including a base to one end of which is pivotally connected a treadle platform over which the livestock is constrained to pass, and a pair of insecticide pump and treadle supporting hydraulic pressure cylinders fixed to opposite corners of the frame at one end thereof, the pressure cylinders supporting the free end of the treadle platform and effecting automatic spraying of insecticide on livestock stepping on and depressing the treadle platform, said pressure cylinders having means regulating pressure and spray rate regardless of the weight of the livestock or speed of treadle action, and means for effecting repositioning of the treadle platform.

PATENTED AUG 31 1971
3,602,199
FIG.1.
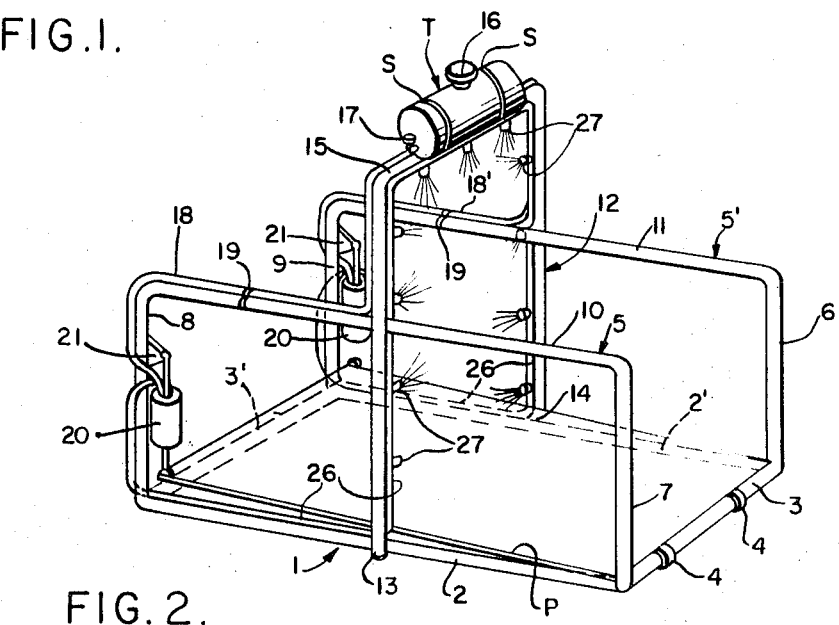
FIG.2.
FIG.3.
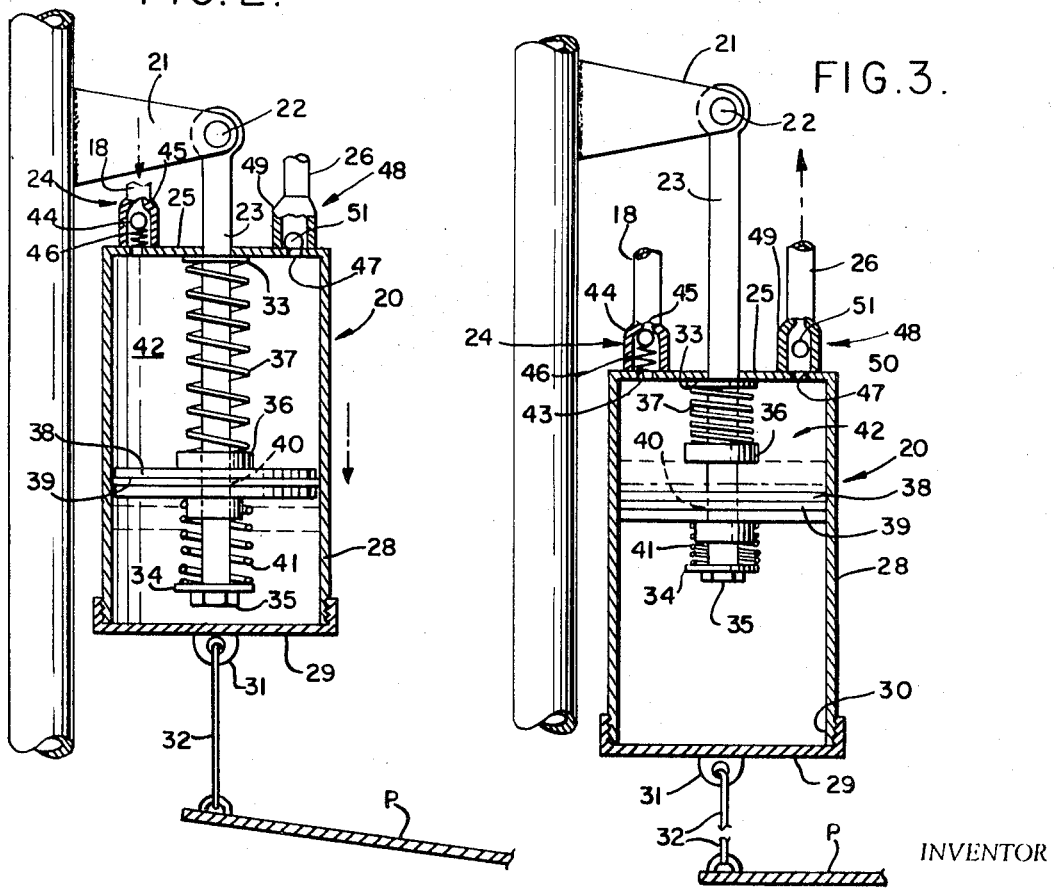
INVENTOR
RICHARD E. DIGGS
BY Shoemaker and Mattare
ATTORNEYS

AUTOMATIC LIVESTOCK SPRAYER

BACKGROUND AND SUMMARY OF THE INVENTION

The present invention relates to an automatic livestock sprayer wherein a treadle platform over which the livestock is constrained to pass is operatively connected to at least one pressure cylinder for automatically causing an insecticide to be sprayed through a plurality of spray nozzles in a controlled and regulated manner for treating the livestock.

In a preferred embodiment, the livestock sprayer has a frame including a pair of longitudinally extending confinement rails for constraining livestock to pass from one end to the other through the livestock sprayer. The treadle platform is pivotally fixed at one end to the base of the frame and has its other end connected through links to a pair of insecticide pump and treadle supporting pressure cylinders for causing movement of the cylinders in a downward direction consequent to movement of the treadle as livestock step thereon. A bow frame member or the like is fixed substantially midway of the frame and supports an insecticide tank on its upper end. An insecticide supply conduit is connected between each end of the tank and an inlet in one end of each of the pressure cylinders for conveying insecticide from the tank to the pressure cylinders. An insecticide spray conduit is connected between an outlet from each pressure cylinder and a plurality of spray nozzles for conveying insecticide from the pressure cylinder to the spray nozzles for treatment of livestock passing through the sprayer.

The pressure cylinders, according to the present invention, are each provided with a floating piston and a pressure equalizing spring operating on the piston to compensate for surges in pressure as the treadle is depressed to insure that a constant and regulated spraying of insecticide is effected by the sprayer. The automatic livestock sprayer of the present invention thus obviates the problems existent in prior art livestock sprayers which have no means for compensating for pressure surges or for ensuring that a steady and complete dosage of insecticide or the like is applied to the livestock. For example, most spraying devices disclosed in the prior art simply utilize the weight of the animal or the like being treated to operate a valve to establish communication between a pressurized source of insecticide and spray nozzles to treat the animal or the like. In those devices disclosed in the prior art in which the weight of the animal is utilized to directly pressurize the material to be sprayed to force the material through a spray nozzle to treat the animal or the like, a sudden surge or charge of treating material is injected or forced through the spray nozzles upon depressing a treadle upon which the animal or the like steps and there is no assurance that a complete dosage of insecticide or the like will be applied to the animal or the like when the treadle is depressed.

OBJECTS OF THE INVENTION

Accordingly, it is an object of the present invention to provide a livestock sprayer for automatically spraying livestock. Another object is to utilize the animals' weight to effect operation of the sprayer by means of a treadle platform connected to operate an insecticide pump.

A further object is to utilize stored energy generated by depressing the treadle to raise the treadle to its up or cocked position.

A still further object is to provide a unitary insecticide pump and treadle supporting pressure cylinder.

An even further object is to provide means in the insecticide pump and treadle supporting pressure cylinder for regulating or controlling the spray pressure and quantity and rate of spraying of insecticides.

Another object is to provide an automatic livestock sprayer which accomplishes a smooth and steady spray of insecticide or the like thereby lessening the danger of causing the animal or the like being treated to become excited.

These and other objects of the invention will become apparent from a study of the following detailed description and drawings, wherein like reference numerals throughout the several views indicate like parts.

BRIEF DESCRIPTION OF THE DRAWINGS

FIG. 1 is a schematic perspective view of the automatic livestock sprayer of the present invention;

FIG. 2 is a schematic sectional plan view of the pressure cylinder of the present invention with the treadle in its up or cocked position;

FIG. 3 is a schematic sectional plan view of the automatic sprayer of the present invention with the treadle in its down or spraying position.

DETAILED DESCRIPTION OF THE INVENTION

Referring to FIG. 1 wherein a preferred embodiment is shown, the automatic livestock sprayer according to the present invention has a frame 1 including a pair of longitudinally extending side frame members 2 and 2' joined at their opposite ends by a pair of laterally extending end frame members 3 and 3' to form a base for the frame. A treadle platform P of substantially the same width and length of the base is fitted within the base and pivoted at one end frame member 3 by means of hinges or the like 4. A pair of longitudinally extending confinement rails 5 and 5' are secured to the base and include vertically extending corner posts 6, 7, 8 and 9 from each corner of the base with the upper ends of the corner posts on each side of the base being connected by horizontally extending rails or guides 10 and 11. A bow frame 12 is secured at its lower free ends 13 and 14 intermediate the opposite ends of the side frame members 2 and 2' of the base and has an insecticide tank T fixed by suitable fasteners such as straps S or the like to the upper end or bight portion 15 thereof. The bright portion 15 of the bow frame 12 is disposed at an elevation sufficient to enable cattle or similar animals to pass thereunder and the width of the frame or the spacing between rails 10 and 11 is such that the animal is constrained to pass longitudinally therebetween and is prevented from turning within the frame of the sprayer. The insecticide tank T includes a fill nozzle or cap 16 and a pair of valve controlled outlets 17 in each end thereof adjacent the bottom of the tank to which are connected a pair of insecticide supply lines 18 and 18' shaped to conform to or closely follow the upper part of the bow frame and the confinement rails and mounted thereto by suitable brackets or the like 19. An insecticide pump and treadle supporting pressure cylinder 20 is mounted to each of the corner posts 8 and 9 at one end of the frame 1 by means of associated bifurcated cylinder support brackets 21 welded at one side thereof to the associated corner post and a bolt or the like 22 passed through the bracket and the shaft 23 for the piston. The insecticide supply lines 18 and 18' communicate with the pressure cylinders 20 through an inlet check valve 24, FIGS. 2 and 3, disposed in the upper end 25 of each of the pressure cylinders. An insecticide spray line 26 is also connected to the upper end of each of the pressure cylinders and extends from the pressure cylinders to the base of the frame and upwardly along and substantially following the sides and top of the bow frame and include a plurality of spray nozzles 27 thereon through which the insecticide is sprayed onto an animal standing or walking on the treadle platform.

Details of the construction of the pressure cylinders or insecticide pump and treadle supports 20 of the present invention are seen most clearly in FIGS. 2 and 3, and since the construction of the cylinders is identical, only one will be described. The pressure cylinder 20 comprises an outer cylindrical housing 28 having a top wall 25 and a removable bottom wall 29 secured to the cylindrical housing 28 as by a threaded connection 30 or the like. The bottom wall 29 includes an eye or link attaching member 31 to which is secured at one end a link or rod 32 fixed at its other end to one corner of the treadle platform P. The piston shaft 23 secured to the bracket 21 extends through an opening in the top wall 25 and is sealed thereto by means of a shaft seal 33. The lower or inner end of the piston shaft has a spring retainer washer 34 held to the shaft by means of a retaining nut 35. A piston stop 36 is fixed to the shaft intermediate the ends of the shaft and spaced a predetermined distance from retaining washer 34 and provides a seat for a treadle and cylinder return spring 37 which is engaged between the piston stop and the top end 25 of the cylinder. A floating piston 38 is slidably disposed on the piston shaft between the piston stop 36 and the spring retainer washer 34 and is slidably sealed to the cylinder walls by a piston cylinder seal 39 and to the piston shaft by a piston shaft seal 40. A pressure equalizer spring 41 is disposed between the spring retainer 34 and the floating piston 38 for normally urging the piston against the piston stop 36. The floating piston 38 forms with the cylinder wall 28 and the upper end 25 of the cylinder a pump chamber 42. An inlet 43 to the pump chamber 42 from the insecticide supply line 18 is in the top wall 25 and is controlled by a check valve comprising a ball 44 urged to seal against a seat 45 by a valve return spring 46. An outlet 47 from the pump chamber 42 to the insecticide spray line 26 is also in the top wall 25 and is controlled by a gravity operated check valve 48 having a valve cage 49 and a seat 50 on which a ball check valve 51 is adapted to seat.

In operation, when a cow or other animal steps upon the treadle platform P the weight of the animal urges the platform downwardly carrying with it the pressure cylinder 28 against the force of the treadle and cylinder return spring 37. This downward movement of the treadle and pressure cylinder 28 compresses or reduces the space in the pump chamber 42, pressurizing the insecticide therein and forcing the insecticide out through the outlet check valve 48 and insecticide spray line 26 to the spray nozzles 27 where the insecticide is sprayed on the animal. During this pressure stroke, the inlet check valve 24 is closed under the influence of the spring 46 and also due to the pressure within the pump chamber 42. The floating piston 38 compensates for surges in pressure resulting from the sudden application of the weight of the animal to the treadle platform P and downward movement of the cylinder 28 by moving from its normal position shown in dotted lines in FIG. 3 against piston stop 36 downwardly on the piston shaft away from piston stop 36 against the influence of equalizer spring 41 to the full line position shown in FIG. 3, thus cushioning or absorbing the sharp increase in pressure in pump chamber 42 and, in effect, storing the hydraulic pressure created by downward movement of the cylinder 28 in equalizer spring 41. As the insecticide is exhausted from the pump chamber 42 through the insecticide spray line 26, the pressure equalizer spring 41 forces the floating piston 38 upwardly from the dotted line position shown in FIG. 2 to its normal position against piston stop 36 thereby maintaining a constant and steady pressure on the insecticide in the pump chamber and in the insecticide spray line throughout a complete spray cycle. Accordingly, instead of experiencing a sudden surge of pressure and a short spurt of insecticide from the spray nozzles resulting in ineffective treatment of the animal or the like, and the possibility of damage to the system due to the sudden increase in pressure, the present invention provides an insecticide pump and treadle platform supporting cylinder which operates to effectively eliminate sudden pressure surges and to maintain a constant and steady spray of insecticide throughout the stroke of the piston.

As the animal or the like steps off of the treadle platform, the treadle and cylinder return spring 41 forces the cylinder 28 upwardly along the piston shaft 23 carrying with it the treadle platform P. As the cylinder moves upwardly, the space in the pump chamber 42 expands reducing the pressure therein and the inlet check valve 44 opens against the force of the valve return spring 46 admitting a fresh charge of insecticide to the pump chamber. The pressure cylinder of the present invention thus automatically effects a prolonged and effective spray cycle spraying a complete charge of insecticide on an animal or the like being treated and automatically returns the treadle to its up or cocked position, drawing a new charge of insecticide into the pump chamber for a subsequent spraying cycle.

The quantity of the charge to be sprayed may be adjusted simply by repositioning the piston stop 36 on the shaft 23 or by interposing a modified linkage arrangement between cylinder 28 and treadle platform P to effect less movement of the cylinder than of the treadle platform. For example, a 2:1 ratio of treadle movement to cylinder movement could be used as opposed to the 1:1 ratio of the embodiment described.

In addition, guard or shield means, not shown, may be provided for attachment adjacent the pressure cylinders to protect them from damage caused by being kicked or otherwise struck by the animal or the like as it passes through the sprayer. Similarly, the insecticide supply lines and spray lines may be positioned on or within the frame such as to be safe from contact with the animal or the like as it passes through the sprayer.

Moreover, the livestock sprayer of the present invention may be fabricated from conventional pipe sections joined together by conventional elbow joints or the like for easy assembly and disassembly and convenience in transporting the sprayer from place to place. Or, the frame may comprise one-piece sections formed or bent to the desired configuration. One advantage to having threaded pipe connections is that the size and shape of the sprayer could easily be made adjustable simply by adding or removing sections to accommodate animals of different size.

As this invention may be embodied in several forms without departing from the spirit or essential characteristics thereof, the present embodiment is therefore illustrative and not restrictive.

I claim:

1. An automatic livestock sprayer actuated by the weight of the animal or the like to be sprayed comprising a frame means, spray means disposed on said frame means, a treadle platform pivotally mounted at one end thereof on said frame means, a combined insecticide pump and treadle support means connected between said frame and said treadle platform and operated by movement of said treadle platform for automatically pumping insecticide or the like from a container of insecticide or the like through said spray means to spray the animal or the like standing on and depressing the treadle platform, said insecticide pump and treadle support means comprising a piston and cylinder assembly operatively connected between said frame means and said treadle platform and including a piston shaft extended into said cylinder, a piston slidably mounted on said shaft in said cylinder, means resiliently urging said piston in a first direction relative to said shaft, movement of said treadle platform causing movement of said piston in a second direction, said resilient means damping pressure surges caused by movement of said treadle platform and effecting a regulated and substantially constant spray of insecticide regardless of the weight of the animal or the speed of treadle action.

2. An automatic livestock sprayer as in claim 1 wherein said frame means includes guide means for constraining the animal or the like to move through the sprayer in a particular manner.

3. An automatic livestock sprayer as in claim 1 wherein the frame means includes elevated support means for supporting a container of insecticide or the like thereon, said insecticide or the like flowing by gravity from the container to the insecticide pump means.

4. An automatic livestock sprayer as in claim 1 wherein said insecticide pump and treadle support means includes means for automatically returning said treadle platform to its raised or normal position when the animal or the like steps off of the same.

5. An automatic livestock sprayer as in claim 1 wherein said frame means includes guide means for constraining the animal or the like to move through the sprayer in a particular manner and elevated support means for supporting a container of insecticide or the like thereon and said insecticide pump and treadle support means includes means for automatically returning said treadle platform to its raised or normal position when the animal or the like steps off of the same.

6. An automatic livestock sprayer as in claim 5 wherein a supply line for insecticide or the like is connected between said container and said insecticide pump and treadle support means, said supply line generally following the outline of a portion of said frame means and secured thereto by clamps or the like.

7. An automatic livestock sprayer as in claim 6 wherein said spray means includes a spray conduit for insecticide or the like connected to said insecticide pump and treadle support means and generally following the outline of a portion of said frame means and secured thereto by clamps or the like, said spray conduit having a plurality of spray nozzles thereon through which the insecticide or the like is sprayed.

8. An automatic livestock sprayer as in claim 1, wherein said piston and cylinder assembly has means therein urging a part of said assembly in a first direction, said treadle platform connected to said part for movement therewith, and said piston and cylinder assembly further includes expansible chamber means in communication with said tank and said spray means for pumping insecticide from said tank to said spray means incident to movement of said treadle platform and said part of said piston and cylinder assembly.

9. An automatic livestock sprayer as in claim 8 wherein said frame means includes a generally rectangular base, an upright corner post connected to and extending upwardly from each corner of the base, the upper ends of the corner posts on opposite longitudinal sides of the base connected or joined by horizontally extending guide rails, said treadle platform being substantially equal in size and shape to said rectangular base and pivoted at one end thereof to one end of said base, and a piston and cylinder assembly connected between each of the corner posts at one end of the base and an associated adjacent corner of the treadle platform.

10. 210. An automatic livestock sprayer as in claim 9 wherein said piston and cylinder assemblies each include a cylindrical housing with a piston shaft slidably and sealably received through one end of said housing and a piston slidably mounted on said shaft within said cylinder, the end of said shaft extending through and beyond said piston and having spring retainer means thereon, spring means engaged between said retainer and said piston for urging said piston toward and against a piston stop means on said shaft between said piston and said one end of said cylinder.

11. An automatic livestock sprayer as in claim 10 wherein said shaft of each piston and cylinder assembly is fixedly connected at one end to the associated corner post, each said cylindrical housing is connected at its other end by link means to an associated corner of the treadle platform and being movable therewith to a first position when said treadle platform is depressed as by an animal or the like stepping thereon, and cylinder and treadle return spring means engaged between said piston stop means and said one end of said cylindrical housing for returning said cylinder to a second position and for repositioning or raising said treadle when the animal or the like steps off of the treadle platform.

12. An automatic livestock sprayer as in claim 11 wherein said piston, said cylindrical housing and said one end of each said cylindrical housing define an insecticide pump chamber, said cylindrical housing moving downwardly relative to said shaft and said piston to a first position when said treadle platform is depressed by the weight of an animal or the like thereon thereby decreasing the volume of said pump chamber and forcing insecticide therein from said pump chamber through said spray means, and said cylindrical housing moving upwardly relative to said shaft and said piston to a second position under the influence of said cylinder and treadle return spring when the animal or the like steps off of the treadle platform thereby increasing the volume of said pump chamber and drawing a new charge of insecticide into said pump chamber and simultaneously returning the treadle platform to a raised position.

13. An automatic livestock sprayer as in claim 12 wherein first check valve means is in said supply line and second check valve means is in said spray line, said first check valve means being open and said second check valve means being closed when said cylindrical housing is moving from its first position to its second position, and said first check valve means being closed and said second check valve means being open when said cylindrical housing is moving from its second position to its first position.